United States Patent
Wang et al.

(10) Patent No.: US 8,471,597 B2
(45) Date of Patent: Jun. 25, 2013

(54) POWER SAVING CIRCUIT USING A CLOCK BUFFER AND MULTIPLE FLIP-FLOPS

(75) Inventors: Shenghong Wang, Yorktown Hts., NY (US); Mayan Moudgill, White Plains, NY (US); Gary Nacer, Morris Plains, NJ (US)

(73) Assignee: Qualcomm Incorporated, San Diego, CA (US)

( * ) Notice: Subject to any disclaimer, the term of this patent is extended or adjusted under 35 U.S.C. 154(b) by 55 days.

(21) Appl. No.: 12/994,115

(22) PCT Filed: May 7, 2009

(86) PCT No.: PCT/US2009/043175
§ 371 (c)(1),
(2), (4) Date: Jul. 1, 2011

(87) PCT Pub. No.: WO2009/146241
PCT Pub. Date: Dec. 3, 2009

(65) Prior Publication Data
US 2011/0254588 A1    Oct. 20, 2011

Related U.S. Application Data

(60) Provisional application No. 61/056,195, filed on May 27, 2008.

(51) Int. Cl.
*H03K 19/173* (2006.01)
*H03K 19/00* (2006.01)
*H03K 19/096* (2006.01)

(52) U.S. Cl.
USPC .................................. 326/93; 326/98; 326/46

(58) Field of Classification Search
USPC .................................. 326/93–98, 37–47, 101
See application file for complete search history.

(56) References Cited

U.S. PATENT DOCUMENTS

| 5,396,129 A | * | 3/1995 | Tabira ............................. 326/93 |
| 5,404,338 A | | 4/1995 | Murai et al. |

(Continued)

FOREIGN PATENT DOCUMENTS

| JP | 60224319 A | 11/1985 |
| JP | 5102312 A | 4/1993 |
| JP | 5206792 A | 8/1993 |
| JP | 2000294737 A | 10/2000 |

OTHER PUBLICATIONS

Calhoun, May 24, 2002, Circuit Techniques for subthreshold leakage reduction in a deep sub-micron process, Masters Thesis submitted to Department of EECS, Massachusetts Institute of Technology.

(Continued)

*Primary Examiner* — Thienvu Tran
(74) *Attorney, Agent, or Firm* — Knobbe Martens Olson & Bear LLP

(57) ABSTRACT

A circuit is described including a clock input for at least one clock signal. Only one clock buffer is connected to the clock input to generate, based on the at least one clock signal, at least a first modified clock signal and a second modified clock signal. A plurality of flip-flops are connected to the clock buffer. Each of the flip-flops receive the first and second modified clock signals. A plurality of data inputs are each connected to at least one of the plurality of flip-flops to provide input data to the plurality of flip-flops. A plurality of data outputs each are connected to at least one of the plurality of flip-flops to provide output data from the plurality of flip-flops. Each of the plurality of flip-flops transform the input data to the output data utilizing the first modified clock signal and the second modified clock signal.

13 Claims, 3 Drawing Sheets

U.S. PATENT DOCUMENTS

| | | | |
|---|---|---|---|
| 5,654,658 | A | 8/1997 | Kubota et al. |
| 6,081,145 | A | 6/2000 | Bandai et al. |
| 6,396,323 | B1 | 5/2002 | Mizuno |
| 6,864,732 | B2 | 3/2005 | Chalasani |
| 8,281,176 | B2 * | 10/2012 | Sherlock .................. 713/400 |
| 2004/0119496 | A1 * | 6/2004 | Park et al. .................. 326/40 |
| 2007/0022339 | A1 * | 1/2007 | Branch et al. ............... 714/726 |
| 2008/0028343 | A1 * | 1/2008 | Sato et al. .................... 716/2 |

OTHER PUBLICATIONS

ISR and WO dated Jul. 9, 2009 in PCT/US09/043175.
IPRP dated Dec. 9, 2010 in PCT/US09/043175.
First Office Action dated Aug. 7, 2012 in Japanese patent application No. 2011-511687.

* cited by examiner

POWER SAVING CIRCUIT USING A CLOCK BUFFER AND MULTIPLE FLIP-FLOPS

CROSS-REFERENCE TO RELATED APPLICATIONS

The present application is the U.S. National Phase of International Application PCT/US2009/043175, filed May 7, 2009, which claims priority benefit under 35 U.S.C. §119(e) to U.S. Provisional Patent Application Ser. No. 61/056,195, filed on May 27, 2008, the contents of which are incorporated herein by reference.

FIELD OF THE INVENTION

The present disclosure relates to circuit structures designed to conserve power during operation. More specifically, the present disclosure concerns a circuit design that relies on multiple flip-flops to conserve power.

DESCRIPTION OF RELATED ART

Flip-flops are common electronic circuit elements. Normally, a typical, single includes one internal clock buffer. The internal clock buffer typically includes two inverters. The internal clock buffer typically drives four switches.

In a traditional circuit design, the size of the two inverters was quite large to assure that the flip-flops meet the performance requirements for the particular circuit.

One advantage to using a large clock inverter is that the circuit designer may realize a significant increase in the driven capabilities of the circuit. Moreover, a large clock inverter may increase circuit speed.

Unfortunately, these advantages were offset by at least one drawback associated with the use of a large clock inverter. Specifically, large clock inverters increase the power for the circuit, and this may be significant for the overall system implementation. In circuits where power consumption is to be minimized, this may present an obstacle to practical implementation of traditional flip-flop circuits.

SUMMARY OF THE INVENTION

It is, therefore, one aspect of the invention to provide a circuit design, incorporating multiple flip-flops, where power consumption is made more efficient.

In other words, the invention provides for a circuit design that incorporates flip-flops but does not also include large clock inverters that consume undesirable amounts of power.

BRIEF DESCRIPTION OF THE DRAWINGS

The invention will be described in connection with several figures in which.

DESCRIPTION OF EMBODIMENT(S) OF THE INVENTION

Several embodiments of the invention will now be described in connection with the drawings appended hereto. As should be immediately apparent to those skilled in the art, there are numerous variations and equivalents of the enumerated embodiments that may be employed without departing from the scope of the invention. The invention is intended to encompass any variations and equivalents that would be appreciated by those of ordinary skill in the art upon reading and understanding this disclosure.

Figure 1:
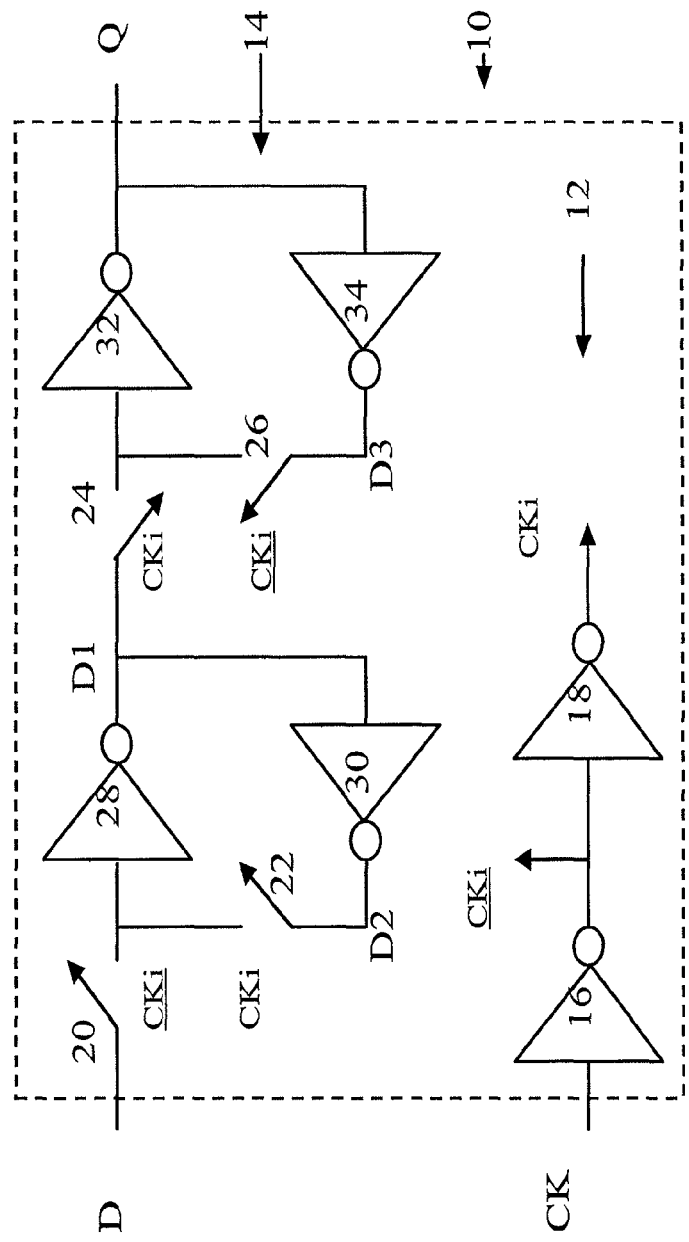
FIG. 1 is circuit schematic for a typical flip-flop.

FIG. 1 illustrates one typical schematic for a design for a circuit 10 known to those skilled in the art. Specifically, the circuit 10 is for a typical flip-flop.

As illustrated in FIG. 1, the circuit 10 includes a clock buffer 12 and a flip-flop 14. As discussed in greater detail below, the clock buffer 12 generates clock signals for the flip-flop 14.

The clock buffer 12 includes two inverters 16, 18 connected to one another in series. The inverter 16 receives an external clock signal CK. The inverter 16 then manipulates the clock signal CK to generate a clock signal CKi, which follows two paths. In a first path, the clock signal CKi is provided to the inverter 18. In a second path, the clock signal CKi is provided to two switches 20, 26. In response to receipt of the clock signal CKi, the inverter 18 modifies the clock signal CKi and generates a clock signal CKi. The clock signal CKi is provided to two switches 22, 24.

As shown in FIG. 1, external data D is an input for the flip-flop circuit 10 along with the clock signal CK. As shown, the data D is provided to the flip-flop 14 within the circuit 10. Output data from the flip-flop 14 and also the circuit 10 is designated by the letter "Q."

As shown in FIG. 1, the data D passes through the switch 20 to the inverter 28. The inverter 28 produces a transformed data signal D1 that takes one of two possible routes. In a first route, the data D1 proceeds to the inverter 30. At the inverter 30, the data D1 is transformed into data D2, where it rejoins the data flow, after the switch 22, and becomes an input to the inverter 28 at a point upstream of the inverter 28 but downstream of the switch 20.

As also shown in FIG. 1, the data D1 proceeds to a switch 24. From the switch 24, the data D1 passes to an inverter 32, where it is transformed into the data Q. The data Q exits from the flip-flop 14 and, therefore, the circuit 10, in one pathway. In another pathway, the data Q is directed to an inverter 34, where it is transformed into data D3. The data D3 then passes through the switch 26 where it re-enters the data stream after the switch 24. As shown, the data D3 joins the data stream at a point after the switch 24 but before the inverter 32.

As noted above, one advantage to this flip-flop approach is that the clock inverters 16, 18 may be powered such that there is a significant gain and also a significant speed for the flip-flop circuit 10. A drawback for this implementation of flip-flop circuit 10 is that the clock inverters 16, 18 are large and, therefore, consume a proportionately large amount of power for the flip-flop circuit 10.

Today, process technology has extended into deep submicron levels for integrated circuits (i.e., <90 nm). As should be appreciated by those skilled in the art, transistor size is made increasingly smaller as manufacturers produce circuits at this sub-micron level (or below). The size of the transistors created at this level places a limit on the size of the clock inverters in a flop. In other words, as transistors are minimized in size, so too are the sizes of the associated clock inverters in a flop. Small size, however, does not necessarily result in decreased performance or capability. Minimally-sized inverters are capable of driving more than four switches without losing speed performance (e.g., maximum frequency, transition time, setup time, hold time, etc). In other words, it is possible to connect two of the same flops together, connected to only one internal clock buffer (made up of two inverters). In so doing, it is possible to save the power consumption of the two internal inverters that make up the clock buffer that otherwise would be provided to the second flop in the traditional circuit design.

In a practical design, when two flops (comprising eight switches) are connected together, it may be necessary to marginally adjust the second clock inverter size to assure that the dual flip-flop has a similar performance to a single flop.

Figure 2:
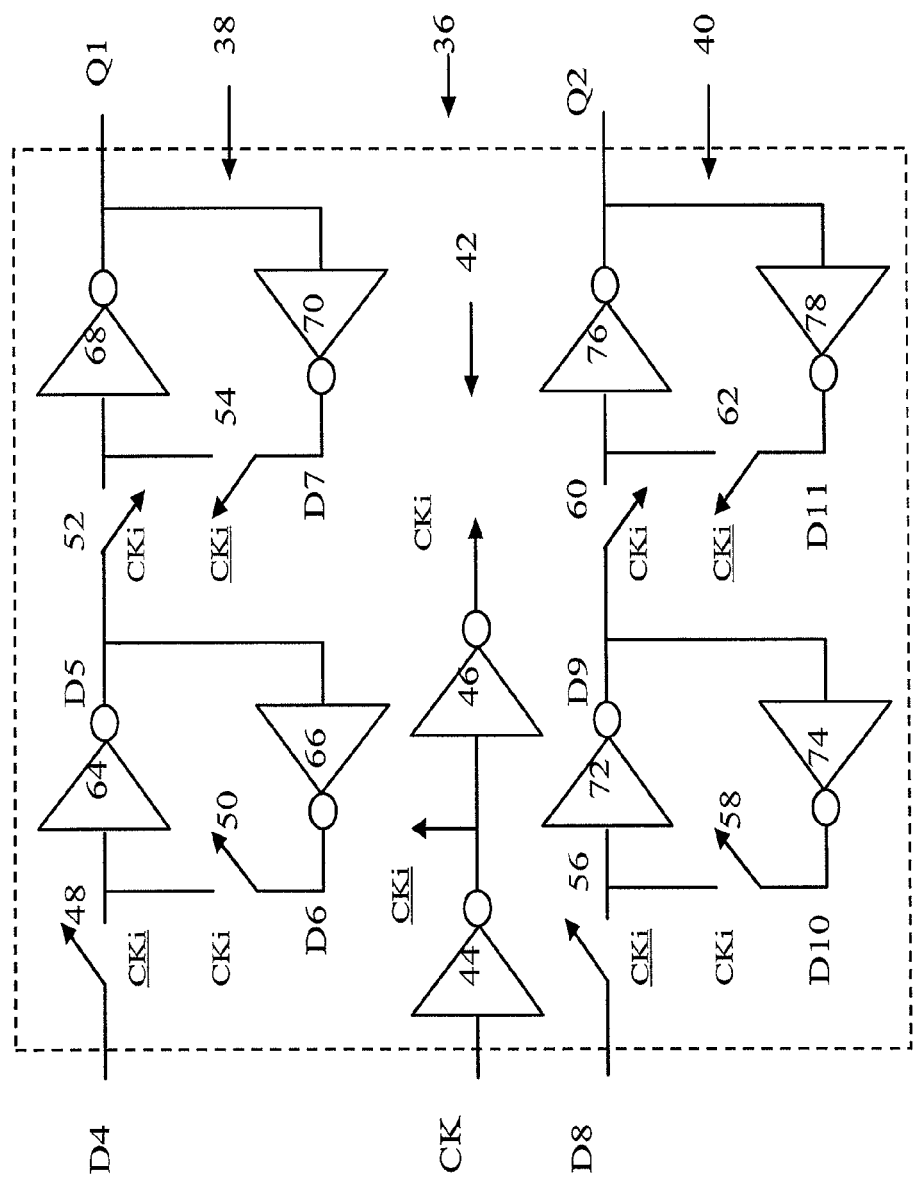
FIG. 2 is a circuit schematic for a first embodiment of a flip-flop-based circuit design according to the invention.

FIG. 2 provides a schematic for a circuit 36 according to the invention. As is immediately apparent, the circuit includes two flip-flops 38, 40. Both of these flip-flops 38, 40 are driven by the same clock buffer 42.

As illustrated in FIG. 2, the clock buffer 42 includes two inverters 44, 46. The inverter 44 receives an external clock signal CK, modifies the clock signal CK, and generates a clock signal CKi. As illustrated, that clock signal CKi is provided as an input into an inverter 46, which modifies the clock signal CKi to generate a clock signal CKi.

The clock signal CKi is provided to switches 48, 54, 56, and 62. The clock signal CKi, in turn, is provided to switches 50, 52, 58, and 60.

As shown in FIG. 2, the data D4 passes through the switch 48 to the inverter 64. The inverter 64 produces a transformed data signal D5 that takes one of two possible routes. In a first route, the data D5 proceeds to the inverter 66. At the inverter 66, the data D5 is transformed into data D6, where it rejoins the data stream and provides input to the inverter 64 at a point upstream of the inverter 64 but downstream of the switch 48.

As also shown in FIG. 2, the data D5 proceeds to the switch 52. From the switch 52, the data D5 passes to an inverter 68, where it is transformed into data Q1. The data Q1 exits from the circuit flip-flop 38 (and, therefore, the circuit 36) in one pathway. In another pathway, the data Q1 is directed to an inverter 70, where it is transformed into data D7. The data D7 then passes through the switch 54 where it rejoins the data stream at a point after the switch 52 but before the inverter 68.

With respect to the flip-flop 40, the data D8 passes through the switch 56 to the inverter 72. The inverter 72 produces a transformed data signal D9 that takes one of two possible routes. In a first route, the data D9 proceeds to the inverter 74. At the inverter 74, the data D9 is transformed into data D10. The data D10 rejoins the data stream and provides input to the inverter 72 at a point upstream of the inverter 72 but downstream of the switch 56.

As also shown in FIG. 2, the data D9 proceeds to the switch 60. From the switch 60, the data D9 passes to an inverter 76, where it is transformed into data Q2. The data Q2 exits from the flip-flop 40 (and, therefore, the circuit 40) in one pathway. In another pathway, the data Q2 is directed to an inverter 78, where it is transformed into data D11. The data D11 then passes through the switch 62 where it rejoins the data stream at a point after the switch 60 but before the inverter 76.

As is immediately apparent from FIG. 2, there are three inputs to the circuit 36, the data D4, the data D8, and the clock signal CK. There are two outputs from the circuit 36, the output data Q1 and the output data Q2.

Experiments indicate that, for both 90 nm and 65 nm process technology, when two flops 38, 40 are combined together with only two minimum size clock inverters 44, 46, it is possible to create a dual flip-flop circuit 36 that performs similarly to a single flop. Specifically, the dual flip-flop circuit 36 operates at the same speed or almost the same speed as a single flop. Moreover, internal switching power consumption is reduced by about 15~25%, as compared with the power consumption of two single flip-flops.

Using a dual flop circuit 36 instead of two single flops in a large design is contemplated to result in significant power savings for the device's clock tree since the sink number for the clock tree is reduced by at least a factor of two (or more). The reduced clock tree load permits reliance on a smaller number of clock tree buffers. In one contemplated embodiment, the number of clock tree buffers may be reduced by half (or more) based on a comparison with prior art designs.

Figure 3:
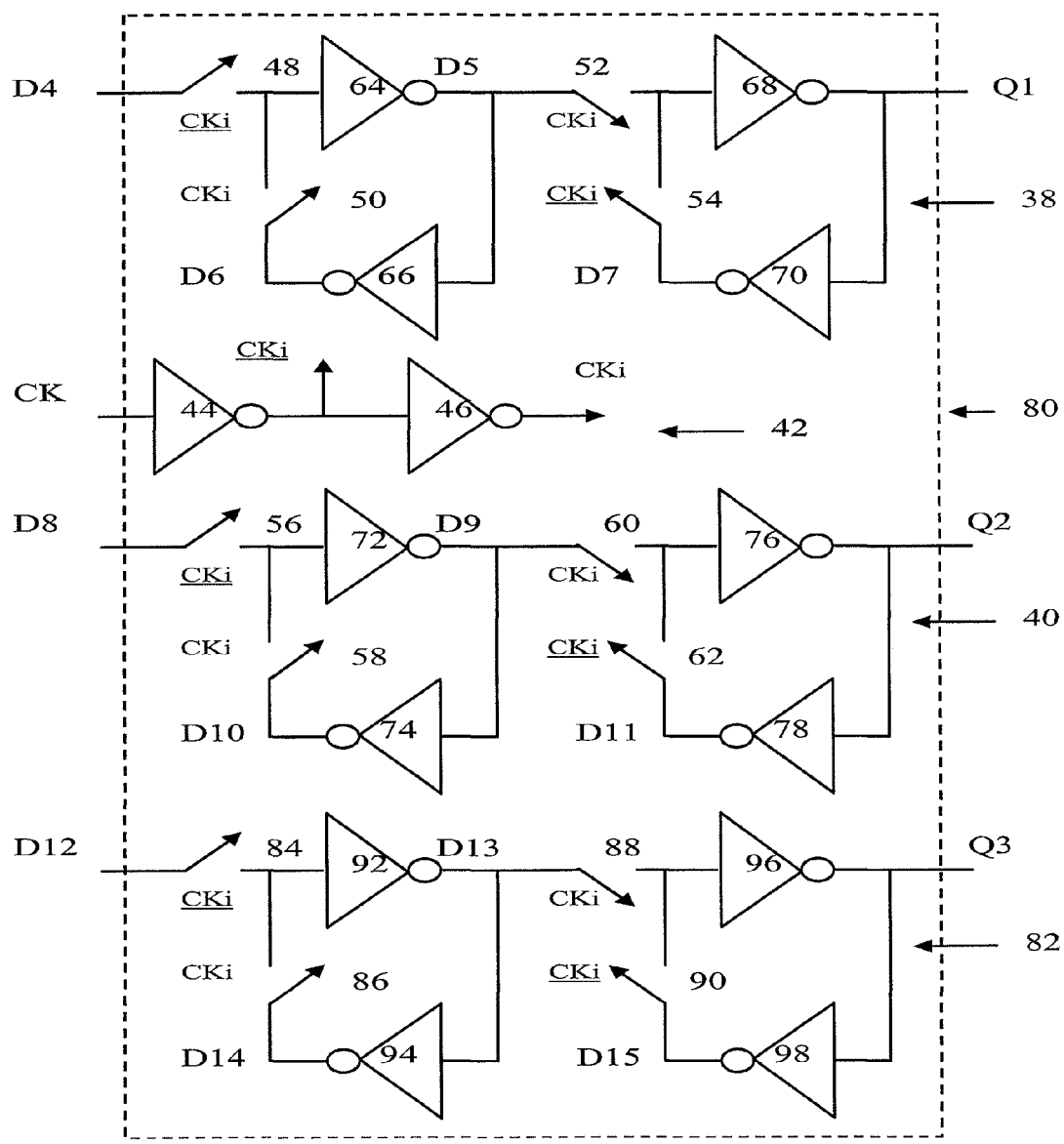
FIG. 3 is a circuit schematic for a second embodiment of a flip-flop-based circuit design according to the invention.

FIG. 3 provides a schematic of a second embodiment of the invention, a circuit 80. The circuit 80 includes three flip-flops 38, 40, and 82. Since the circuit 80 modifies the circuit 36 by adding a third flip-flop 82, reference numerals for two of the flip-flops 38, 40 remain the same. As a result, a discussion of the third flip-flip 82 is provided to simplify the discussion of the circuit 82. The third flip-flop includes four switches 84, 86, 88, 90 and four inverters 92, 94, 96, 98.

As illustrated in FIG. 3, the third flip-flop 82 receives data D12, which passes through the switch 84 to the inverter 92. The inverter 92 produces a transformed data signal D13 that takes one of two possible routes. In a first route, the data D13 proceeds to the inverter 94. At the inverter 94, the data D13 is transformed into data D14. The data D14 rejoins the data stream and provides input to the inverter 92 at a point upstream of the inverter 92 but downstream of the switch 84.

As also shown in FIG. 3, the data D13 proceeds to the switch 88. From the switch 88, the data D13 passes to an inverter 96, where it is transformed into data Q3. The data Q3 exits from the flip-flop 82 (and, therefore, the circuit 80) in one pathway. In another pathway, the data Q3 is directed to an inverter 98, where it is transformed into data D15. The data D15 then passes through the switch 90 where it rejoins the data stream at a point after the switch 88 but before the inverter 96.

As is immediately apparent from FIG. 3, there are four inputs to the circuit 80, the data D4, the data D8, the data D12, and the clock signal CK. There are three outputs from the circuit 80, the output data Q1, the output data Q2, and the output data Q3.

In further embodiments contemplated by this disclosure four or more flip-flops may be associated with a single clock buffer.

In addition, it is contemplated that in one or more of the embodiments described herein, one or both of the clock inverters 44, 46 may be sized to present a minimal aspect. When so sized, the clock inverter 44, 46 may be sized to consume a minimal amount of power. Alternatively, the clock inverter 44, 46 may be made as small in physical size as may be created for the process technology employed (e.g., <90 nm). Other variations should be apparent to those skilled in the art.

In keeping with these variations, only one of the clock inverters 44 or 46 may be sized to present a minimal aspect. This may include only the inverter 44 or the inverter 46. In another contemplated embodiment, both of the clock inverters 44 and 46 may be sized to present a minimal aspect.

Embedding in an ASIC Processor

In a typical Application-Specific integrated Circuit ("ASIC") design flow, a complex circuit is designed using a high-level hardware specification language such as VHSIC (Very High Speed Integrated Circuit) Hardware Description Language ("VHDL") or Verilog (a hardware description language ("HDL")). A synthesis tool converts this into a gate level netlist. These gates then undergo further processing which results in a final mask that can be used to manufacture chips the implement the complex circuit.

When converting from the high-level specification to a gate-level netlist, the synthesis tool selects combinations of gates to implement the behavior specified for using the high-level language. The gates are selected from a library that specifies the available gates, their functional behavior, size, speed and power. The synthesis tool is given a set of constraints, i.e. targets for total size, speed, power, etc. The synthesis tool selects, from the available library elements, the combinations of gates that yield identical function as are specified at the high level and as best meet the targets.

This library, and equivalent other databases, provide information to other tools used in the ASIC design flow. An element whose information has been added to all databases used in the ASIC flow is called a cell.

For dual- and multi- flip-flops to be useful in an ASIC flow, it is contemplated that they are available as cells. In other words, they are provided as library elements so that the synthesis tool may select them, and information about dual and multi- flip-flops are added to all databases, so that all tools involved in the flow may operate on them.

Typically, a cell is made available in different versions with different design strengths, which have identical function but have different performance, size and power characteristics.

With reference to FIGS. 2 and 3, the circuits 36, 80 may be relied upon as individual cells, as may others of the variations and equivalents described herein and appreciated by those skilled in the art.

In variations of the cells, the flip-flops 38, 40, 82 may be available as cells in a standard ASIC flow. Similarly, the flip flops 38, 40, 82 and the clock buffer 42 may be available as a cell or as plural cells in a standard ASIC flow. As noted above, one or both of the inverters 44, 46 in the clock buffer 42 may be sized to present a minimal aspect.

As noted above, several embodiments of the invention have been described. There are numerous variations and equivalents of the enumerated embodiments that may be employed without departing from the scope of the invention, as recited by the claims appended hereto. The invention is intended to encompass those variations and equivalents.

What is claimed:

1. A circuit, comprising:
   a clock input for at least one clock signal;
   a clock buffer connected to the clock input configured to generate, based on the at least one clock signal, at least a first modified clock signal and a second modified clock signal;
   a plurality of flip-flops connected to the clock buffer, each of which is configured to receive the first modified clock signal and the second modified clock signal;
   a plurality of data inputs, each being connected to at least one of the plurality of flip-flops, to provide input data to the plurality of flip-flops; and
   a plurality of data outputs, each being connected to at least one of the plurality of flip-flops, configured to provide output data from the plurality of flip-flops, wherein each of the plurality of flip-flops is configured to transform the input data to the output data utilizing the first modified clock signal and the second modified clock signal generated from the clock buffer;
   wherein the clock buffer comprises:
      at least a first clock inverter and a second clock inverter, connected to one another in series,
      wherein the first clock inverter is configured to receive the at least one clock signal and generate the first modified clock signal from the at least one clock signal, and
      wherein the second clock inverter is configured to receive the first modified clock signal and generate the second modified clock signal from the first modified clock signal.

2. The circuit of claim 1, wherein each of the flip-flops comprise:
   a first switch, connected to at least one of the plurality of data inputs, configured to receive the input data and the first modified clock signal, wherein the first switch is configured to operate based on the first modified clock signal;
   a first inverter, connected to the first switch, configured to transform the input data into first output data;
   a second inverter, connected to the first inverter, configured to convert the first output data into second output data;
   a second switch, connected to the second inverter, configured to receive the second output data and the second modified clock signal, wherein the second switch is configured to operate based on the second modified clock signal to provide the second output data to the first inverter;
   a third switch, connected to the first inverter, configured to receive the first output data and the second modified clock signal, wherein the third switch is configured to operate based on the second modified clock signal;
   a third inverter, connected to the third switch, configured to transform the first output data into the output data for one of the plurality of data outputs;
   a fourth inverter, connected to the third inverter, configured to convert the output data into third output data; and
   a fourth switch, connected to the fourth inverter, configured to receive the third output data and the first modified clock signal, wherein the fourth switch is configured to operate based on the first modified clock signal to provide the third output data to the third inverter.

3. The circuit of claim 1, wherein the plurality of flip-flops and at least one of the first clock inverter and the second clock inverter are available as cells in a standard Application-Specific Integrated Circuit (ASIC) flow.

4. The circuit of claim 1, wherein one of the plurality of flip-flops comprises a first flip-flop, and the first flip-flop and the first clock inverter are available as a cell in a standard Application-Specific Integrated Circuit (ASIC) flow.

5. A circuit, comprising:
   a clock input for at least one clock signal;
   a clock buffer connected to the clock input configured to generate, based on the at least one clock signal, at least a first modified clock signal and a second modified clock signal;
   a plurality of flip-flops connected to the clock buffer, each of which is configured to receive the first modified clock signal and the second modified clock signal;
   a plurality of data inputs, each being connected to at least one of the plurality of flip-flops, to provide input data to the plurality of flip-flops; and
   a plurality of data outputs, each being connected to at least one of the plurality of flip-flops, configured to provide output data from the plurality of flip-flops, wherein each of the plurality of flip-flops is configured to transform the input data to the output data utilizing the first modified clock signal and the second modified clock signal generated from the clock buffer;
   wherein each of the flip-flops comprise:
      a first switch, connected to at least one of the plurality of data inputs, configured to receive the input data and the first modified clock signal, wherein the first switch is configured to operate based on the first modified clock signal;
      a first inverter, connected to the first switch, configured to transform the input data into first output data;
      a second inverter, connected to the first inverter, configured to convert the first output data into second output data;

a second switch, connected to the second inverter, configured to receive the second output data and the second modified clock signal, wherein the second switch is configured to operate based on the second modified clock signal to provide the second output data to the first inverter;

a third switch, connected to the first inverter, configured to receive the first output data and the second modified clock signal, wherein the third switch is configured to operate based on the second modified clock signal;

a third inverter, connected to the third switch, configured to transform the first output data into the output data for one of the plurality of data outputs;

a fourth inverter, connected to the third inverter, configured to convert the output data into third output data; and a fourth switch, connected to the fourth inverter, configured to receive the third output data and the first modified clock signal, wherein the fourth switch is configured to operate based on the first modified clock signal to provide the third output data to the third inverter.

6. The circuit of claim 1, wherein the plurality of flip-flops are available as cells in a standard Application-Specific Integrated Circuit (ASIC) flow.

7. A circuit, comprising:
a clock input for at least one clock signal;
a clock buffer connected to the clock input configured to generate, based on the at least one clock signal, at least a first modified clock signal and a second modified clock signal;
a plurality of flip-flops connected to the clock buffer, each of which is configured to receive the first modified clock signal and the second modified clock signal;
a plurality of data inputs, each being connected to at least one of the plurality of flip-flops, configured to provide input data to the plurality of flip-flops; and
a plurality of data outputs, each being connected to at least one of the plurality of flip-flops, configured to provide output data from the plurality of flip-flops, wherein each of the plurality of flip-flops is configured to transform the input data to the output data utilizing the first modified clock signal and the second modified clock signal generated from the clock buffer;
wherein each of the flip-flops comprise:
a first switch, connected to at least one of the plurality of data inputs, configured to receive the input data and the first modified clock signal, wherein the first switch is configured to operate based on the first modified clock signal;
a second switch configured to receive the second modified clock signal, wherein the second switch is configured to operate based on the second modified clock signal to provide output data;
a third switch configured to receive the second modified clock signal, wherein the third switch is configured to operate based on the second modified clock signal; and
a fourth switch configured to receive the first modified clock signal, wherein the fourth switch is configured to operate based on the first modified clock signal to provide output data.

8. A method of transferring data in a circuit, the method comprising:
receiving a clock input for at least one clock signal;
generating, based on the at least one clock signal, at least a first modified clock signal and a second modified clock signal using a clock buffer;
providing the first modified clock signal and the second modified clock signal to a plurality of flip-flops;
receiving input data for at least one of the plurality of flip-flops; and
transferring output data from the plurality of flip-flops, wherein each of the plurality of flip-flops is configured to transform the input data to the output data utilizing the first modified clock signal and the second modified clock signal generated from the clock buffer;
wherein the clock buffer comprises:
at least a first clock inverter and a second clock inverter, connected to one another in series,
wherein the first clock inverter is configured to receive the at least one clock signal and generate the first modified clock signal from the at least one clock signal, and
wherein the second clock inverter is configured to receive the first modified clock signal and generate the second modified clock signal from the first modified clock signal.

9. The method of claim 8, wherein each of the flip-flops comprise:
a first switch, connected to at least one of the plurality of data inputs, configured to receive the input data and the first modified clock signal, wherein the first switch is configured to operate based on the first modified clock signal;
a first inverter, connected to the first switch, configured to transform the input data into first output data;
a second inverter, connected to the first inverter, configured to convert the first output data into second output data;
a second switch, connected to the second inverter, configured to receive the second output data and the second modified clock signal, wherein the second switch is configured to operate based on the second modified clock signal to provide the second output data to the first inverter;
a third switch, connected to the first inverter, configured to receive the first output data and the second modified clock signal, wherein the third switch is configured to operate based on the second modified clock signal;
a third inverter, connected to the third switch, configured to transform the first output data into the output data for one of the plurality of data outputs;
a fourth inverter, connected to the third inverter, configured to convert the output data into third output data; and
a fourth switch, connected to the fourth inverter, configured to receive the third output data and the first modified clock signal, wherein the fourth switch is configured to operate based on the first modified clock signal to provide the third output data to the third inverter.

10. The method of claim 8, wherein the plurality of flip-flops and at least one of the first clock inverter and the second clock inverter are available as cells in a standard Application-Specific Integrated Circuit (ASIC) flow.

11. The method of claim 8, wherein one of the plurality of flip-flops comprises a first flip-flop, and the first flip-flop and the first clock inverter are available as a cell in a standard Application-Specific Integrated Circuit (ASIC) flow.

12. A method of transferring data in a circuit, the method comprising:
receiving a clock input for at least one clock signal;
generating, based on the at least one clock signal, at least a first modified clock signal and a second modified clock signal using a clock buffer;
providing the first modified clock signal and the second modified clock signal to a plurality of flip-flops;

receiving input data for at least one of the plurality of flip-flops; and transferring output data from the plurality of flip-flops, wherein each of the plurality of flip-flops is configured to transform the input data to the output data utilizing the first modified clock signal and the second modified clock signal generated from the clock buffer;

wherein each of the flip-flops comprise:
- a first switch, connected to at least one of the plurality of data inputs, configured to receive the input data and the first modified clock signal, wherein the first switch is configured to operate based on the first modified clock signal;
- a first inverter, connected to the first switch, configured to transform the input data into first output data;
- a second inverter, connected to the first inverter, configured to convert the first output data into second output data;
- a second switch, connected to the second inverter, configured to receive the second output data and the second modified clock signal, wherein the second switch is configured to operate based on the second modified clock signal to provide the second output data to the first inverter;
- a third switch, connected to the first inverter, configured to receive the first output data and the second modified clock signal, wherein the third switch is configured to operate based on the second modified clock signal;
- a third inverter, connected to the third switch, configured to transform the first output data into the output data for one of the plurality of data outputs;
- a fourth inverter, connected to the third inverter, configured to convert the output data into third output data; and
- a fourth switch, connected to the fourth inverter, configured to receive the third output data and the first modified clock signal, wherein the fourth switch is configured to operate based on the first modified clock signal to provide the third output data to the third inverter.

13. A method of transferring data in a circuit, the method comprising:

receiving a clock input for at least one clock signal;

generating, based on the at least one clock signal, at least a first modified clock signal and a second modified clock signal using a clock buffer;

providing the first modified clock signal and the second modified clock signal to a plurality of flip-flops;

receiving input data for at least one of the plurality of flip-flops; and transferring output data from the plurality of flip-flops, wherein each of the plurality of flip-flops is configured to transform the input data to the output data utilizing the first modified clock signal and the second modified clock signal generated from the clock buffer;

wherein each of the flip-flops comprise:
- a first switch, connected to at least one of the plurality of data inputs, configured to receive the input data and the first modified clock signal, wherein the first switch is configured to operate based on the first modified clock signal;
- a second switch configured to receive the second modified clock signal, wherein the second switch is configured to operate based on the second modified clock signal to provide output data;
- a third switch configured to receive the second modified clock signal, wherein the third switch is configured to operate based on the second modified clock signal; and
- a fourth switch configured to receive the first modified clock signal, wherein the fourth switch is configured to operate based on the first modified clock signal to provide output data.

* * * * *